US011062525B1

(12) United States Patent
Manser et al.

(10) Patent No.: US 11,062,525 B1
(45) Date of Patent: Jul. 13, 2021

(54) METHOD FOR GENERATING AN AUGMENTED SET OF IMAGES

(71) Applicant: United States of America, as represented by the Secretary of the Army, Fort Belvoir, VA (US)

(72) Inventors: Kimberly E. Manser, Alexandria, VA (US); Sina Simingalam, McLean, VA (US); Joseph P. Reynolds, Haymarket, VA (US); Jason A. Willis, Dumfries, VA (US); Van A. Hodgkin, Stafford, VA (US); Roger W. Thompson, Jr., Springfield, VA (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 17/105,700

(22) Filed: Nov. 27, 2020

Related U.S. Application Data

(60) Provisional application No. 62/966,630, filed on Jan. 28, 2020.

(51) Int. Cl.
  *G06T 19/00* (2011.01)
  *G06T 5/00* (2006.01)
  *G06T 5/50* (2006.01)

(52) U.S. Cl.
  CPC ............ *G06T 19/006* (2013.01); *G06T 5/002* (2013.01); *G06T 5/003* (2013.01); *G06T 5/009* (2013.01); *G06T 5/50* (2013.01)

(58) Field of Classification Search
  CPC ....... G06T 19/006; G06T 5/002; G06T 5/009; G06T 5/50; G06T 5/003
  See application file for complete search history.

(56) References Cited

U.S. PATENT DOCUMENTS

| 5,761,070 | A  | * | 6/1998 | Conners | B07C 5/3422 |
| | | | | | 345/426 |
| 2015/0055855 | A1 | * | 2/2015 | Rodriguez | G06K 9/6259 |
| | | | | | 382/159 |
| 2015/0146032 | A1 | * | 5/2015 | Rime | H04N 13/232 |
| | | | | | 348/222.1 |
| 2018/0165508 | A1 | * | 6/2018 | Othman | G06K 9/42 |
| 2018/0253865 | A1 | * | 9/2018 | Price | G06N 3/0454 |
| 2019/0213434 | A1 | * | 7/2019 | Zamfir | G06T 11/60 |
| 2019/0230297 | A1 | | 7/2019 | Knorr et al. | |

* cited by examiner

*Primary Examiner* — Sarah Lhymn
(74) *Attorney, Agent, or Firm* — Richard J. Kim

(57) ABSTRACT

A method for generating an augmented set of images involves data collection, data processing, and data augmentation processing performed to merge images. The data collection comprises the steps of choosing objects as selected objects, choosing configurations for imaging of the selected objects, and taking pictures with a second camera to create a set of raw object images. The data processing comprises the steps of performing dynamic range adjustment on the raw object image, performing color correction for corrected images, and removing uniform background from the corrected images to result in object images. The data augmentation processing performed to merge images comprises the steps of performing range simulation or magnification for resampled images, adding blur to the resampled images, adding noise to create final object images, and merging the final object images to the field images of a first camera to create a set of augmented images.

15 Claims, 5 Drawing Sheets

METHOD FOR GENERATING AN AUGMENTED SET OF IMAGES

CROSS-REFERENCE TO RELATED APPLICATIONS

This application claims priority to U.S. Provisional Patent Application No. 62/966,630, filed on Jan. 28, 2020, the disclosure of which is incorporated herein by reference in its entirety.

GOVERNMENT INTEREST

The invention described herein may be manufactured, used, sold, imported, and/or licensed by or for the Government of the United States of America.

FIELD OF THE INVENTION

The present subject matter relates generally to generating a set of augmented images.

BACKGROUND OF THE INVENTION

Presently, artificial intelligence and machine learning (AI/ML) has enabled the creation of software programs such as Neural Net (NN) algorithms that can be trained with training images to recognize objects in new images. However, many images are needed to perform the training, and more unusual objects are not included in a large number of presently available image databases. Thus, a method of making large training sets of images is needed, which preferably does not involve simply taking new images of the unusual objects, as this can be very costly and time consuming.

SUMMARY OF THE INVENTION

The present invention broadly comprises a method for generating an augmented set of images. In one aspect, the method generates an augmented set of images involving data collection, data processing, and data augmentation processing performed to merge images. The data collection comprises the steps of choosing objects as selected objects, choosing configurations for imaging of the selected objects, and taking pictures with a second camera to create a set of raw object images. The data processing comprises the steps of performing dynamic range adjustment on the raw object image, performing color correction for corrected images, and removing uniform background from the corrected images to result in object images. The data augmentation processing performed to merge images comprises the steps of performing range simulation or magnification for resampled images, adding blur to the resampled images, adding noise to create final object images, and merging the final object images to the field images of a first camera to create a set of augmented images.

In another aspect, the method includes measuring the optical and electronic characteristics of a first camera, generating a set of raw object images for a plurality of objects and a plurality of configurations with a second camera, performing data processing on the raw object images to match image characteristics of the raw object images to image characteristics of the first camera to create final object images, and creating the augmented set of images by adding the final object images to field images collected with the first camera.

Yet, in another aspect, The method includes measuring the optical and electronic characteristics of a first camera; generating a set of raw object images for a plurality of objects and a plurality of configurations with a second camera; and performing data processing on the raw object images to match image characteristics of the raw object images to image characteristics of the first camera to create the augmented set of images.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

To solve the above noted problem, the present inventors created a method to create a large set of training images by incorporating images of unusual objects into pre-existing background images. For example, in one embodiment, a first camera, such as a GoPro® camera, may be used to take images in the field, and then a second camera, such as a Grasshopper® camera, can be characterized and used to take images of unusual objects in a lab. The object images are then incorporated into the field images in various configurations to create augmented images. Therefore, a large set of training images is created without taking a large set of images in the field.

In another embodiment, both the first and second cameras are sensors that detect radiation in the infrared (IR) spectrum, and the images are IR images.

Figure 1:
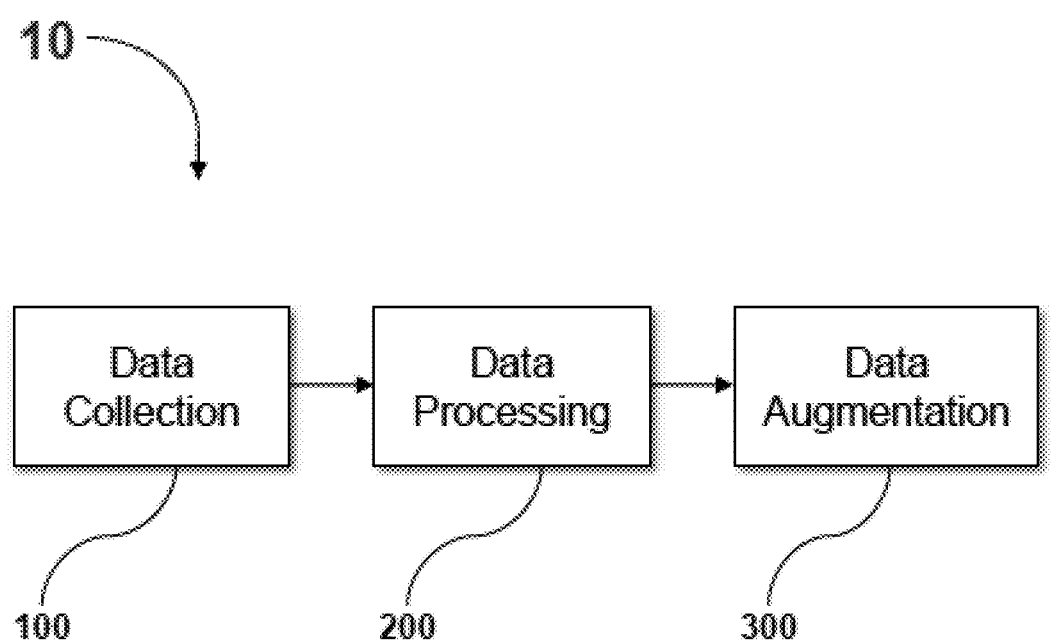
FIG. 1 illustrates a method in accordance with an embodiment of the present invention.

FIG. 1 illustrates a method 10 for generating a set of augmented images according to a first embodiment of the present invention. Method 10 includes the steps of data collection (step 100), data processing (step 200), and data augmentation (step 300).

Figure 2:
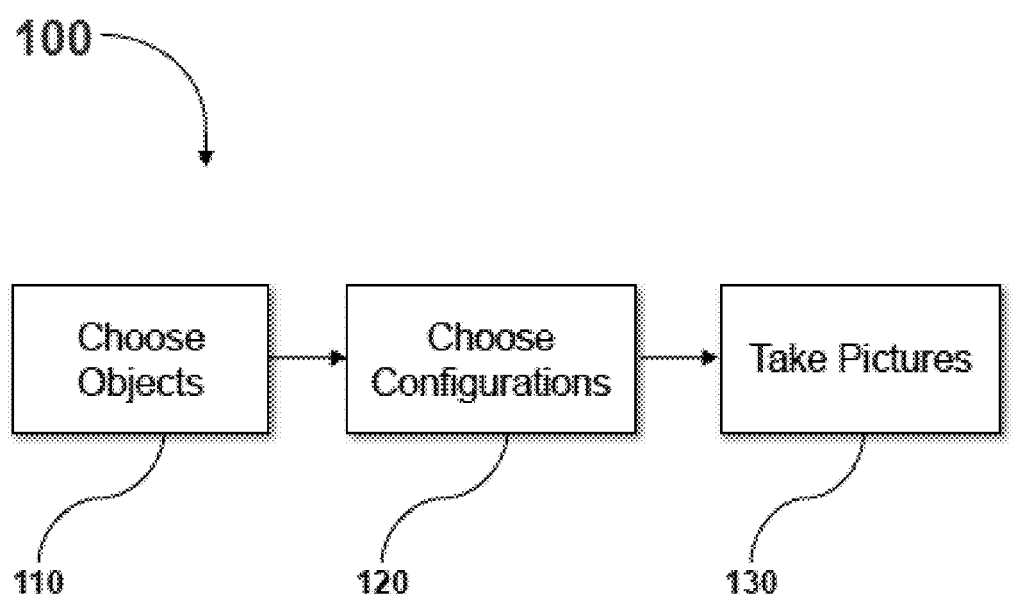
FIG. 2 shows a data collection method in accordance with an embodiment of the present invention.

FIG. 2 shows the steps in the data collection step: choose objects (step 110), choose configurations (step 120), and take pictures (step 130). In step 110, objects that are desired to be added to the training datasets are selected. Step 120 includes choosing all of the configurations for the images of the selected objects, such as view angle of the camera with respect to nadirs, aspect or rotational angles of the object turntable 60 (shown in FIG. 3), lighting conditions, and aperture sizes. After all the configurations are selected, pictures are taken corresponding to all combinations of the selected configurations to create a set of raw object images.

Figure 3:
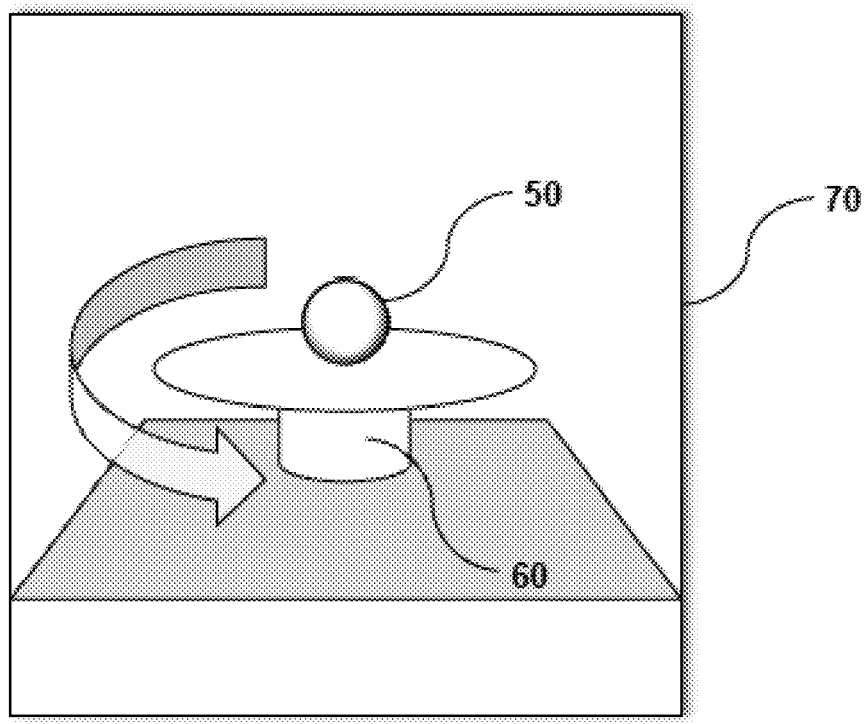
FIG. 3 shows a data collection apparatus in accordance with an embodiment of the present invention.

The raw object images are taken of the objects against a uniform background dissimilar to the object, as shown in FIG. 3. Object 50 sits on turntable 60, which is located over uniform background 70. Turntable 60 allows for images to be taken at a variety of rotational angles. Uniform background 70 allows for the background to be removed during image processing, as discussed later in step 230. In one embodiment using visible light images, uniform background 70 may be a green screen. In another embodiment using IR images, uniform background 70 may be a uniform temperature background.

Figure 4:
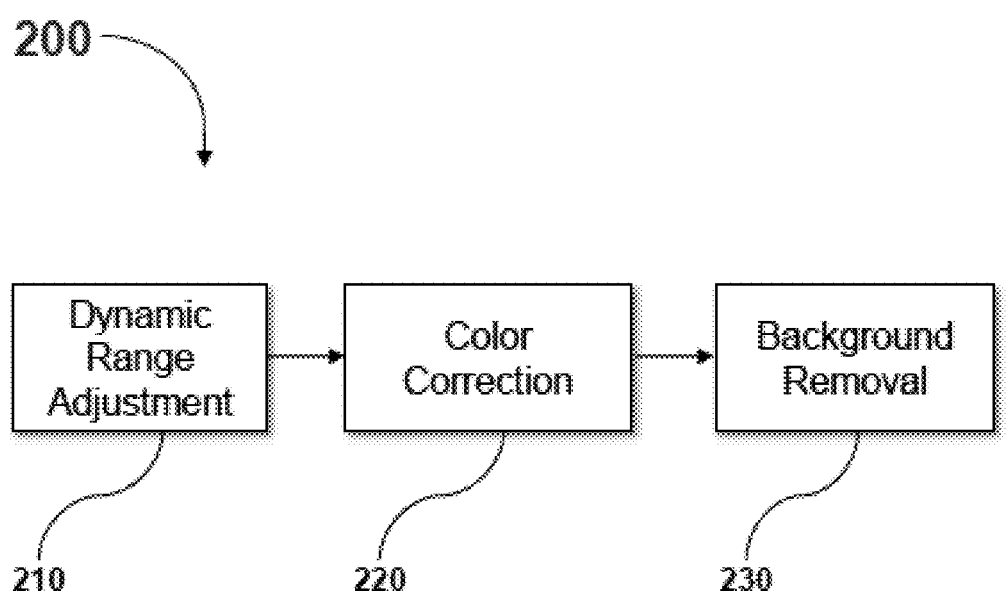
FIG. 4 illustrates a data processing method in accordance with an embodiment of the present invention.

FIG. 4 illustrates the data processing (step 200) that is performed on the raw object images. Step 210 includes performing dynamic range adjustment on the raw object images. In one embodiment, two different aperture sizes are used in order to vary the contrast in the images. The high light level (larger aperture) images are adjusted with a predetermined gain value, calculated using the uniform background, which is constant across all targets. In one embodiment, this gain is applied to each image globally, but if more than 0.5% of the pixels are saturated, the gain is decreased until the 0.5% threshold is met. In order to preserve intensity differences for a specific object, the same gain may be applied to the lower light level (smaller aperture) images of that object.

Step 220 then performs color correction. An X-Rite® color chart and a set of reflectance standards may be used as references for the color correction, and these were captured by both cameras for each environmental variation selected in step 120. Comparing the values of the XRite® color chart in both the first and second camera images, a color correction matrix was created to transform the colors from the second camera and emulate the first camera.

In the embodiment where the first camera is a GoPro® camera, the color correction is performed as follows. The GoPro® shifts color using a simple rational fraction equation to correct the color, as shown below. The $p_1$, $p_2$, and, $q_1$ variables were fit using the reflectance standards.

$$y = \frac{p_1 x + p_2}{x + q_1}$$

Because color correction must be done on linear color images, the GoPro® image is linearized by solving the equation above for x and applying the resulting equation to the GoPro® images prior to color correction. The Grasshopper® outputs linear data natively and requires no linearization step.

$$x = -\frac{p_2 - q_1 * y}{p_1 - y}$$

For a linearized image reference, let $C_{GP}$ be the 24×3 linear GoPro® X-Rite® color values with 3 columns representing the red, green and blue color channels, and $C_{GH}$ similarly be the Grasshopper® XRite® color values. The color correction matrix ($M_C$) is therefore:

$$M_C = C_{GH}^{-1} C_{GP}$$

This color correction matrix provides color channel weights to shift the ratio of the R, G, and B channels in a Grasshopper® image to the same ratios in the GoPro® image.

In another embodiment where the first camera is an IR spectrum sensor, step 220 matches an apparent temperature. In general, step 220 matches a pixel intensity balance of the first camera.

Step 230 removes the uniform background from the images. In one embodiment, to perform the background removal a mask may be created from the high light level (larger aperture) imagery by sectioning the background portions of the image using either HSV or L*a*b histogram analysis and creating a binary mask file with background and object regions. The background region may then be removed from the image using this mask, and a flat gray background may be inserted in its place. The mask used to remove the background region can be saved with the object image for any future processing or background insertion. It may also serve as labeling data for the location of the object in the image for training purposes.

Figure 5:
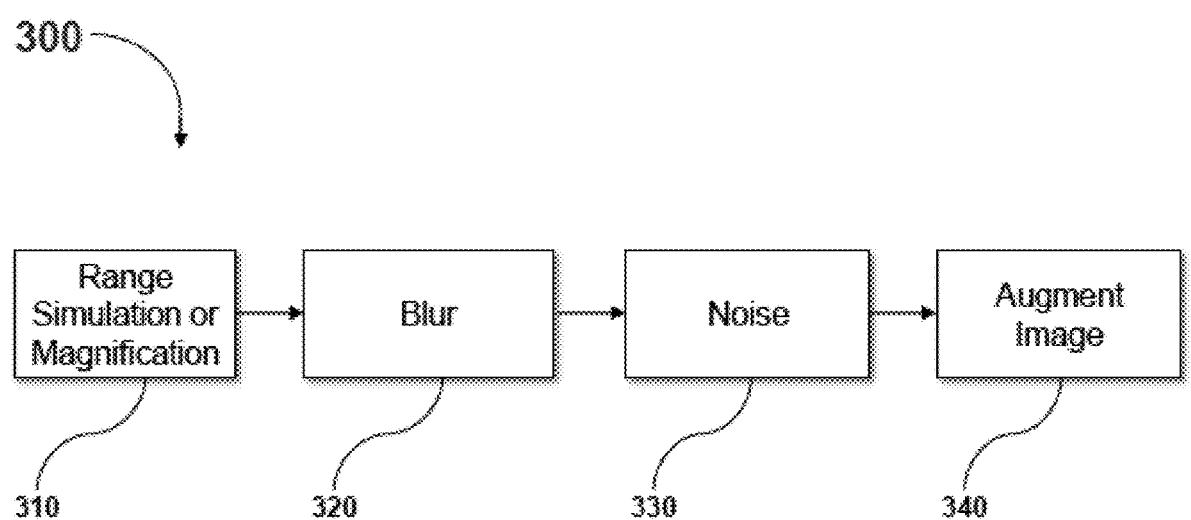
FIG. 5 shows a data augmentation method in accordance with an embodiment of the present invention.

FIG. 5 illustrates the data augmentation processing (step 300) that is performed to merge the object images into the field images. Step 310 performs range simulation or magnification. In one embodiment, range or magnification variation includes at least 6 ranges, but sometimes up to 10 depending on the object (smaller objects have additional higher magnification values). To simulate range variation, the second camera images were resampled using integer-based magnification. By forcing integer values in the resampling, higher-order frequency effects such as edge ringing and other artifacts are avoided.

Range or magnification serves two different purposes. First, the individual field of view in the second camera is made to match that of the first camera in order to have equal images. This allows application of the correct camera effects, which are defined in angular space, and the sampling needs to be the same for that step.

Second, this generates images with varying magnification to simulate different ranges that could not be collected in the lab. This is an important part of the process, because it adds variety. This is done in addition to and after matching the individual field of view of the first camera.

The sampling ratio between the input and output images is given by:

$$s = \frac{f_{s_{in}} r_{out}}{f_{s_{out}} r_{in}}$$

where $f_{sin}$ and $f_{sout}$ are the system sampling frequencies (in cycles per radian), and $r_{in}$ and $r_{out}$ are the image magnifications for the second camera and the augmented image, respectively. In this case, $r_{in}=1$. To emulate the first camera, the input and output camera characteristics were taken from what is known about the second camera and first camera, respectively. This includes characteristics like pixel pitch, pixel count, f/#, and FOV. The sampling ratio, $f_{sin}/f_{sout}$, must be equal to or greater than one.

The above sampling ratio matches the sampling between the two cameras. In addition, more ranges are simulated by resampling at different ratios.

Once the resampling is completed, the images are padded to match the first camera format (for example, 3000×4000 pixels).

Step 320 adds blur to the images, and step 330 adds noise to the images to create final object images. The blur and noise variations are designed to account for potential environmental degradations like low light or dust. After the imagery was resampled and padded in step 310, the blur and noise are applied. A modulation transfer function (MTF) was applied to the image as a component of the presample MTF, which includes the added blur, objective lens diffraction, and the detector MTF. The application of the MTF was done in Fourier space.

White noise with user-defined RMS was then added to each color channel of the object images, individually. (This could be done for a camera having any number of channels, such as a multispectral camera.) In one embodiment, the augmented dataset includes 2 noise levels and 3 blur levels. The first noise and blur values (a blur value of 1 mrad and negligible noise) are estimates of the first camera baseline values, while the other blur and noise values represent degradation of the first camera imagery.

Finally, step 340 adds the final object images to field images to create a set of augmented images. For example, 10,000 field images (taken with the first camera) can be augmented with 4,000 object images (collected with the second camera) to create over 175,000 augmented images. This much larger set of augmented images can then be used to train AI/ML algorithms.

In another embodiment step 340 simply takes the final set of object images to be the augmented set of images. This allows images to be added to a training database without being provided any field images. In this case, the images taken in step 130 would be modified as described to emulate a different camera (the first camera) than the camera used in the method (the second camera).

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

It is obvious that many modifications and variations of the present invention are possible in light of the above teachings. It is therefore to be understood that within the scope of the appended claims, the invention may be practiced otherwise than as described.

What is claimed is:

1. A method for generating an augmented set of images, the method comprising the steps of:
    data collection, comprising the steps of:
        choosing objects as selected objects,
        choosing configurations for imaging of the selected objects, and
        taking pictures with a second camera to create a set of raw object images;
    data processing performed on the raw object images, comprising the steps of:
        performing dynamic range adjustment on the raw object image,
        performing color correction for corrected images, and
        removing uniform background from the corrected images to result in object images; and
    data augmentation processing performed to merge the object images of the second camera into field images of a first camera, comprising the steps of:
        performing range simulation or magnification for resampled images,
        adding blur to the resampled images,
        adding noise to create final object images, and
        merging the final object images to the field images of a first camera to create a set of augmented images.

2. The method for generating an augmented set of images according to claim 1, wherein the field images of the first camera are linearized for performing color correction.

3. The method for generating an augmented set of images according to claim 1, wherein a mask is used to remove the uniform background.

4. The method for generating an augmented set of images according to claim 1, wherein the resampled images are resampled using integer-based magnification.

5. The method for generating an augmented set of images according to claim 1, wherein said configurations for imaging of the selected objects are chosen from a group comprising a view angle of a camera with respect to nadirs, aspect or rotational angles of the object, lighting conditions, and aperture sizes.

6. A method for generating an augmented set of infrared images, the method comprising the processes of:
    data collection, comprising the steps of:
        choosing objects as selected objects,
        choosing configurations for imaging of the selected objects, and
        taking infrared images with a second infrared sensor to create a set of raw object images;
    data processing performed on the raw object images, comprising the steps of:
        performing dynamic range adjustment on the raw object image,
        performing correction of apparent temperature for pixel intensity balanced images, and
        removing uniform background from the pixel intensity balanced images to result in object images; and
    data augmentation processing performed to merge the object images of the second infrared sensor into field images of a first infrared sensor, comprising the steps of:
        performing range simulation or magnification for resampled images,
        adding blur to the resampled images,
        adding noise to create final object images, and
        merging the final object images to the field images of a first infrared sensor to create an augmented set of infrared images.

7. The method for generating an augmented set of infrared images according to claim 6, wherein taking infrared images with a second infrared sensor comprises the steps of:
    placing an object on a turntable,
    locating the turntable against a uniform temperature background, and
    generating a raw object images at a variety of rotational angles of the turntable against the uniform temperature background.

8. A method for generating an augmented set of images, the method comprising the steps of:
    measuring optical and electronic characteristics of a first camera as image characteristics of the first camera;

generating a set of raw object images for a plurality of objects and a plurality of configurations with a second camera, wherein a raw object image is generated based on the steps of:
- placing an object on a turntable,
- locating the turntable against a uniform background such as a green screen, and
- generating a raw object image at a respective rotational angle of the turntable against the uniform background;

performing data processing on the raw object images to match image characteristics of the raw object images to image characteristics of the first camera to create final object images as a basis for the augmented set of images.

9. The method for generating an augmented set of images according to claim 8, further comprising:
creating the augmented set of images by adding the final object images to field images collected with the first camera.

10. The method for generating an augmented set of images according to claim 8, wherein a set of final object images are the augmented set of images.

11. The method for generating an augmented set of images according to claim 8, wherein the optical and electronic characteristics of a first camera are chosen from the group comprising pixel pitch, pixel count, f/#, and FOV.

12. The method for generating an augmented set of images according to claim 8, wherein the step of performing data processing includes modifying the raw object images to match a pixel intensity balance of the first camera.

13. The method for generating an augmented set of images according to claim 8, wherein the step of performing data processing includes removing a background in the raw object images.

14. The method for generating an augmented set of images according to claim 13, wherein the step of performing data processing further includes adding a replacement background in the raw object images after the background is removed.

15. The method for generating an augmented set of images according to claim 8, wherein the step of performing data processing includes modifying the raw object images to simulate different ranges.

\* \* \* \* \*